United States Patent
Furuya

(10) Patent No.: US 7,793,957 B2
(45) Date of Patent: Sep. 14, 2010

(54) STEERING DAMPING DEVICE

(75) Inventor: Ken Furuya, Tokyo (JP)

(73) Assignee: Kayaba Industry Co., Ltd., Tokyo (JP)

( * ) Notice: Subject to any disclaimer, the term of this patent is extended or adjusted under 35 U.S.C. 154(b) by 229 days.

(21) Appl. No.: 12/213,152

(22) Filed: Jun. 16, 2008

(65) Prior Publication Data

US 2009/0000890 A1 Jan. 1, 2009

(30) Foreign Application Priority Data

Jun. 29, 2007 (JP) .............................. 2007-172146
Apr. 4, 2008 (JP) .............................. 2008-098110

(51) Int. Cl.
*B62K 21/08* (2006.01)

(52) U.S. Cl. ........................... 280/272; 280/89; 280/90; 188/290

(58) Field of Classification Search ................... 280/89, 280/89.12, 89.13, 90, 271, 272, 276; 188/290
See application file for complete search history.

(56) References Cited

U.S. PATENT DOCUMENTS

| 4,566,712 | A | | 1/1986 | Motrenec | |
|---|---|---|---|---|---|
| 4,736,962 | A | * | 4/1988 | Motrenec | 280/272 |
| 4,773,514 | A | * | 9/1988 | Gustafsson | 280/272 |
| 6,796,571 | B2 | * | 9/2004 | Mengoli | 188/306 |
| 6,848,698 | B2 | * | 2/2005 | Hasegawa et al. | 280/272 |
| 6,916,033 | B2 | * | 7/2005 | Yih | 280/272 |
| 7,011,324 | B2 | * | 3/2006 | Salonia et al. | 280/272 |
| 7,044,489 | B2 | * | 5/2006 | Bunya et al. | 280/272 |
| 7,052,027 | B2 | * | 5/2006 | Gogo et al. | 280/272 |
| 7,156,408 | B2 | * | 1/2007 | Kettler et al. | 280/279 |
| 7,267,350 | B2 | * | 9/2007 | Yamada et al. | 280/272 |
| 7,318,592 | B2 | * | 1/2008 | Iwamoto et al. | 280/90 |
| 7,377,533 | B2 | * | 5/2008 | Takeuchi et al. | 280/272 |
| 7,390,004 | B2 | * | 6/2008 | Gogo et al. | 280/272 |
| 7,631,735 | B1 | * | 12/2009 | VanValkenburgh | 188/290 |
| 2004/0188975 | A1 | * | 9/2004 | Yoshimoto | 280/276 |
| 2006/0220340 | A1 | * | 10/2006 | Seki et al. | 280/272 |
| 2007/0045982 | A1 | * | 3/2007 | Tomonaga | 280/272 |
| 2007/0095624 | A1 | * | 5/2007 | Ito | 188/314 |
| 2007/0176392 | A1 | * | 8/2007 | Schiffer et al. | 280/272 |
| 2007/0216124 | A1 | * | 9/2007 | Wakabayashi et al. | 280/89 |
| 2008/0054591 | A1 | * | 3/2008 | Fuse et al. | 280/272 |

FOREIGN PATENT DOCUMENTS

| CN | 1635968 A | 7/2005 |
|---|---|---|
| JP | 08-011761 | 1/1996 |

* cited by examiner

*Primary Examiner*—Lesley Morris
*Assistant Examiner*—Marc A Scharich
(74) *Attorney, Agent, or Firm*—Rabin & Berdo, PC

(57) ABSTRACT

A steering shaft (2) penetrates a head tube (1) fixed to a vehicle body (A) of a motorcycle. The steering shaft (2) is coupled to a front wheel and handlebars of the motorcycle. A linear damper of a double-rod type is enclosed in the steering shaft (2). When the steering shaft (2) rotates with respect to the vehicle body (A), a feed screw (12) engaged with a screw portion (11) on the outer circumference of one of the piston rods (6*a*, 6*b*) causes the linear damper to operate. By enclosing the linear damper in the steering shaft (2), a space for disposing the steering damping device can be minimized. The feed screw (12) converts a rotational displacement of the steering shaft (2) into an axial displacement of the piston rods (6*a*, 6*b*) such that a bending load does not act on the piston rods (6*a*, 6*b*).

10 Claims, 3 Drawing Sheets

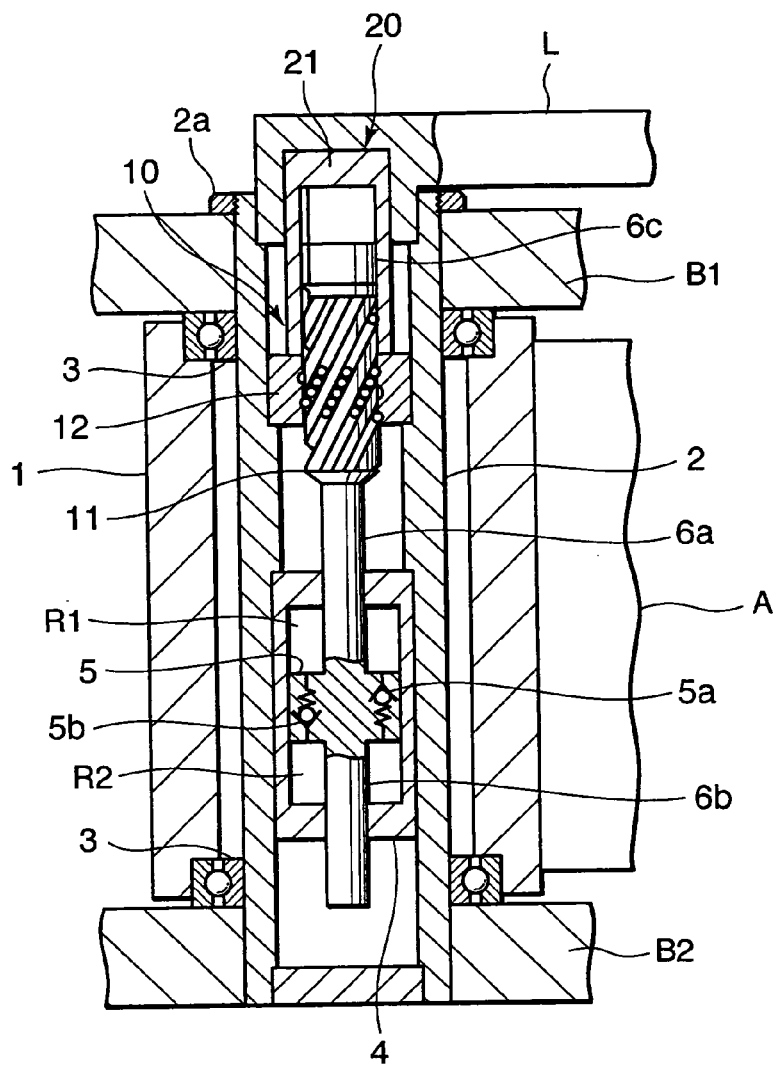
FIG. 2
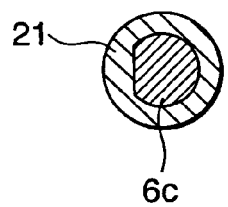
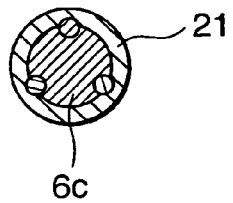
FIG. 3A                FIG. 3B

STEERING DAMPING DEVICE

FIELD OF THE INVENTION

This invention relates to a steering damping device for suppressing unintended yaw of a front wheel and handlebars of a motorcycle during travel.

BACKGROUND OF THE INVENTION

JPH08-011761 A published by the Japan Patent Office in 1996 discloses a steering damper for suppressing unintended yaw or yaw oscillation of a front wheel and handlebars of a motorcycle due to shimmy or kickback during travel.

The steering damper is constituted by a double-rod type linear damper having a pair of piston rods fixed to both ends of a piston accommodated in a cylinder so as to be free to slide. The pair of piston rods project axially from the cylinder. Resistance against axial displacement of the piston in the cylinder can be adjusted from outside.

The cylinder is connected to a vehicle body of the motorcycle and one of the pair of the piston rods is connected to the handlebars at a location offset from a steering center of the handlebars.

When the handlebars are turned, the cylinder and the piston rod connected to the handlebars contract or elongate in an axial direction causing the piston to displace axially in the cylinder. Two oil chambers are separated in the cylinder by the piston, and working oil moves between the two oil chambers via an orifice according to the displacement of the piston in the cylinder. A flow resistance of working oil through the orifice brings about a damping force that damps yaw of the front wheel and the handlebars.

SUMMARY OF THE INVENTION

In the steering damper according to the prior art, not only an axial load but also a bending load is exerted on the piston rod when yaw or yaw oscillation of the front wheel and the handlebars occurs. The bending load can be a factor that prevents the steering damper from operating smoothly. Further, the piston rod must have enough strength to bear the bending load.

In the steering damper according to the prior art, the linear damper is displaced independently of the vehicle body and handlebars and requires a bracket for connecting the cylinder to the vehicle body and a bracket for connecting the piston rod to the handlebars. As a result the steering damper may interfere with other accessories of the motorcycle.

It is therefore an object of this invention to provide a steering damping device for a motorcycle which is free from a bending load and does not require a large space for installation.

In order to achieve the above object, this invention provides a steering damping device for a motorcycle in which a front wheel and handlebars are connected to a vehicle body so as to be displaceable in a direction of yaw. The motorcycle comprises a steering shaft which performs a rotational displacement with respect to the vehicle body accompanying yaw of the front wheel and the handlebars. The device comprises a linear damper and a displacement conversion mechanism. The linear damper is disposed in the steering shaft and comprises a component which performs a linear motion. The displacement conversion mechanism converts the rotational displacement of the steering shaft into the linear motion of the component.

The details as well as other features and advantages of this invention are set forth in the remainder of the specification and are shown in the accompanying drawings.

BRIEF DESCRIPTION OF THE DRAWINGS

FIG. 2 is a vertical sectional view of the essential parts of the motorcycle including the steering damping device, taken along a line II-II in FIG. 1.

FIGS. 3A and 3B are enlarged cross-sectional views of a connection structure between a ball screw portion and a guide tube according to this invention.

DESCRIPTION OF THE PREFERRED EMBODIMENTS

A steering damping device according to this invention has a function to suppress unintended yaw or yaw oscillation of a front wheel and handle bars of a motorcycle due to shimmy or kickback of the front wheel, and is constructed as described below.

Figure 1:
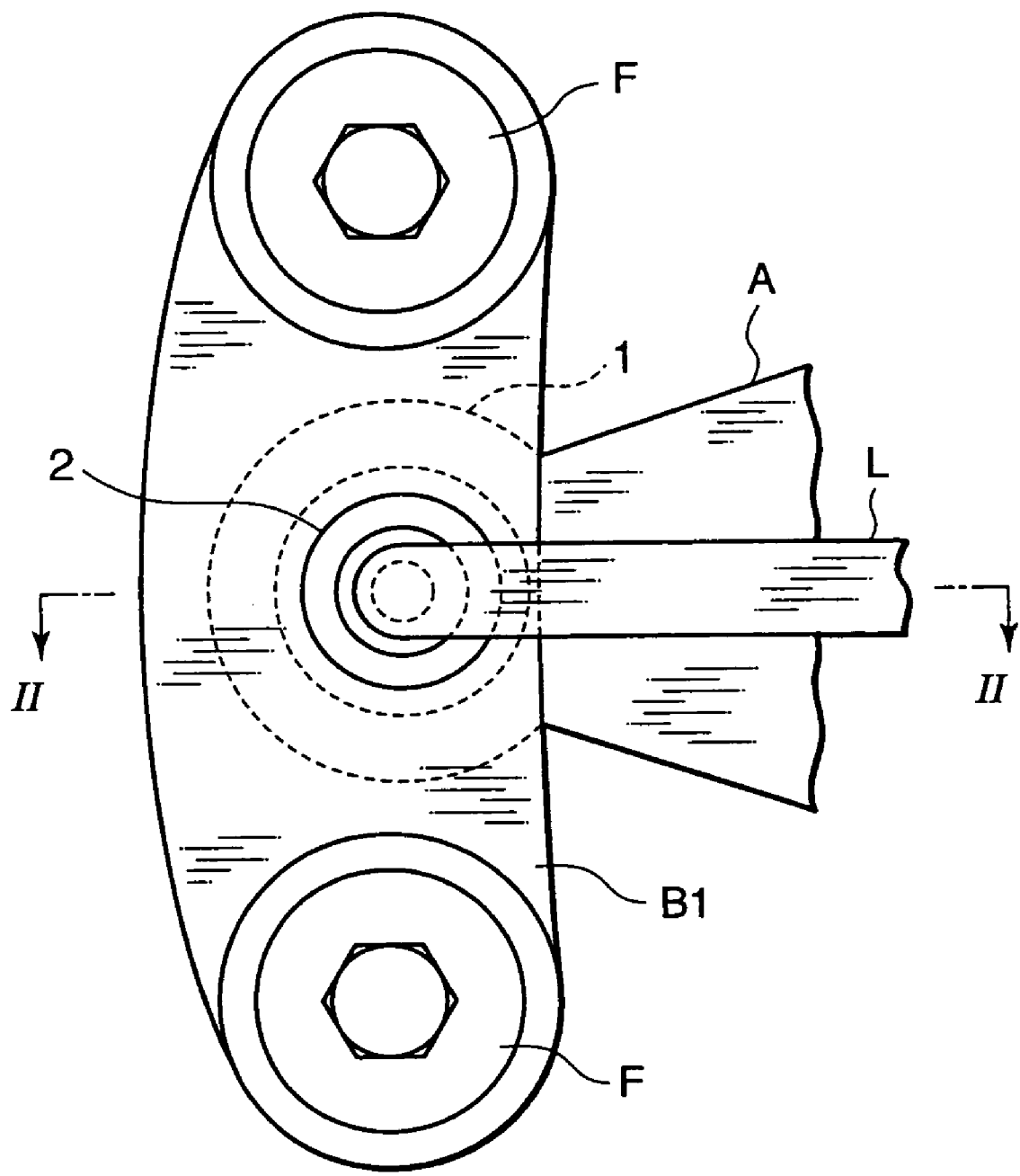
FIG. 1 is a schematic plan view of essential parts of a motorcycle showing a layout of a steering damping device according to this invention.

Referring to FIGS. 1 and 2, a head tube 1 is fixed to a front end of a vehicle body A of the motorcycle. A hollow steering shaft 2 penetrates the head tube 1 coaxially.

A pair of front forks F support the front wheel. Upper ends of the pair of front forks F are fixed to an upper fork bracket B1 and a lower fork bracket B2. A lower end of the steering shaft 2 is press fitted to the lower fork bracket B2 while an upper end of the steering shaft 2 penetrates the upper fork bracket B1 and is fixed to the upper fork bracket B1 by a nut 2a which is screwed onto the outer circumference of the upper end of the steering shaft 2.

The steering shaft 2 is supported by the head tube 1 so as to be free to rotate via a pair of bearings 3 which are disposed on the inner circumference of the head tube 1.

The handlebars are fixed to the fork brackets B1 and B2.

When the fork brackets B1 and B2 rotationally displace together with the handlebars and the front wheel in a direction of yaw of the front wheel, i.e., in a clockwise or anti-clockwise direction in FIG. 1, the steering shaft 2 rotates with respect to the head tube 1.

A linear damper is installed in an inner space of the steering shaft 2.

The linear damper comprises a cylinder 4 fixed to an inner circumferential surface of the steering shaft 2, a piston 5 accommodated in the cylinder 4 so as to be free to slide in an axial and rotational direction, and a pair of piston rods 6a and 6b of an identical diameter which are fixed to both ends of the piston 5 and project axially from the cylinder 4. Each of the piston 5 and the piston rods 6a, 6b functions as a component of the linear damper which performs a linear motion. On the inner side of the cylinder 4, two oil chambers R1 and R2 are delimited by the piston 5. The oil chambers R1 and R2 are filled with working oil. In the description below, the piston rod 6a is named as an upper piston rod 6a and the piston rod 6b is named as a lower piston rod 6b.

In this embodiment, the cylinder 4 is fitted to the inner circumferential surface of the steering shaft 2. It is possible to eliminate the cylinder 4 and arrange the piston 5 to slide directly on the inner circumferential surface of the steering shaft 2. In this case, the oil chambers R1 and R2 are formed in the inner space of the steering shaft 2 delimited by the piston 5. By eliminating the cylinder 4, the cross-sectional area of the oil chambers R1 and R2 can be increased and the number of components of the steering damping device can be decreased.

In the piston 5, an elongation damping valve 5a which allows a flow of oil from the oil chamber R1 to the oil chamber R2 under a predetermined flow resistance while preventing a flow of oil in the opposite direction, and a compression damping valve 5b which allows a flow of oil from the oil chamber R2 to the oil chamber R1 under a predetermined flow resistance while preventing a flow of oil in the opposite direction, are installed in parallel with each other. The elongation damping valve 5a and the compression damping valve 5b have identical specifications. A known damping valve can be applied as the damping valves 5a and 5b.

Instead of providing the damping valves 5a and 5b in the piston 5, it is possible to provide a connecting passage outside the cylinder 4 to connect the oil chambers R1 and R2 and the damping valves 5a and 5b may be installed in parallel in the connecting passage. It is also possible to replace the damping valves 5a and 5b by a single valve or an orifice.

By making a pressure receiving area of the piston 5, which receives the pressure of the working oil in the oil chamber R1, and a pressure receiving area of the piston 5, which receives the pressure of the working oil in the oil chamber R2, identical as well as the specifications of the elongation damping valve 5a and the compression damping valve 5b, the damping force characteristic in a compression stroke of the piston 5 and the damping force characteristic in an elongation stroke of the piston 5 are identical.

A rotational relative displacement between the vehicle body A and the handlebars, or in other words a rotational relative displacement between the head pipe 1 and the steering shaft 2 is converted into a linear motion of the piston 5 via a displacement conversion mechanism. The steering damping device comprises a ball screw 10 and a rotation prevention unit 20.

The ball screw 10 comprises a screw portion 11 which forms a part of the upper piston rod 6a, and a ball nut 12 which is fixed to the inner circumferential surface of the steering shaft 2 as a feed screw. The ball nut 12 engages with the outer circumference of the screw portion 11 via bearing balls. Spiral grooves are formed in the outer circumferential surface of the screw portion 11 and the inner circumferential surface of the ball nut 12 and the bearing balls are interposed between these grooves. This is a known structure of a ball screw.

The rotation prevention unit 20 comprises a guide tube 21 which engages with an outer circumference of an upper end portion 6c of the upper piston rod 6 extending upward from the screw portion 11. The guide tube 21 is arranged to allow displacement of the upper end portion 6c of the upper piston rod 6 in an axial direction while preventing displacement thereof in a rotational direction with respect to the guide tube 21. Various engaging structures can be applied to the guide tube 21 and the upper end portion 6c of the upper piston rod 6 to realize the above function.

FIGS. 3A and 3B show examples of the engaging structure of the guide tube 21 and the upper end portion 6c of the upper piston rod 6.

Referring to FIG. 3A, the upper end portion 6c of the upper piston rod 6 is formed into a non-circular cross-sectional shape and fitted into the guide tube 21 having the same cross-sectional inner shape.

Referring to FIG. 3B, the upper end portion 6c of the upper piston rod 6 and the guide tube 21 are engaged with each other via pairs of linear grooves and bearing balls interposed therebetween.

An upper part of the guide tube 21 is engaged fixedly with an end of a link L, another end of which is fixed to the vehicle body A. Various known engaging structures including those described above may be applied to the engagement between the guide tube 21 and the link L.

With the ball screw 10 and the rotation prevention unit 20 constructed as described above, when the handlebars are turned with respect to the vehicle body A, the fork brackets B1 and B2 to which the handlebars are fixed rotate together with the steering shaft 2, the cylinder 4, and the ball nut 12 about the piston 5 and the piston rods 6a, 6b.

When the steering shaft 2 rotates with respect to the piston rod 6a on which the screw portion 11 is formed, the ball nut 12 fixed to the steering shaft 2 functions as a feed screw to exert a thrust force on the piston rod 6a, causing the piston rod 6a to displace axially. Accordingly, the piston 5 displaces in an axial direction in the cylinder 4. As the piston 5 displaces axially in the cylinder 4, working oil flows between the chamber R1 and the chamber R2 through the damping valve 5a or 5b, and a damping force is generated in the damping valve 5a or 5b due to a flow resistance thereof. The damping force thus generated damps the rotational displacement of the handlebars, and abrupt turning of the handlebars is thereby mitigated.

Yawing motion of the front wheel caused by shimmy or kickback of the front wheel is transferred to the fork brackets B1 and B2 via the pair of front forks F and rotates the fork brackets B1 and B2 about the piston 5 and the piston rods 6a and 6b. In this case also, the steering damping device generates a damping force against the rotational displacement of the fork brackets B1 and B2 with respect to the vehicle body A as in the case of handlebars operation. An unintended yaw or yaw oscillation of the front wheel is thereby suppressed.

Since the damper cylinder which generates the damping force is of a double-rod type, the steering damping device shows a constant damping characteristic irrespective of the rotation direction and the rotation angle of the fork brackets B1 and B2 while the motorcycle is running.

Most components of the steering damping device according to this invention, including the linear damper, are disposed in the steering shaft 2 penetrating the head tube 1 and are not exposed to the outside of the steering shaft 2. A space outside the head pipe 1 which is used for the steering damping device is therefore small.

Further, since the displacement conversion mechanism converts the rotational displacement of the steering shaft 2 into the linear motion of the linear damper, no bending load is exerted on the piston rods 6a, 6b. According to this invention, therefore, a preferable effect is obtained in terms of structure.

In the embodiment described above, the rotation prevention unit 20 is disposed around the upper end portion 6c of the piston rod 6a, but another arrangement is also possible.

Specifically, the lower piston rod 6b may penetrate to a space under the steering shaft 2 and a penetrating end thereof may be engaged with an end of the link L, another end of which is fixed to the vehicle body A. If a space is available under the fork brackets B2 for disposing the link L, the rotation prevention unit 20 may be constructed in this way.

Further, the entire steering damping device shown in FIG. 2 may also be turned upside down.

Figure 4:
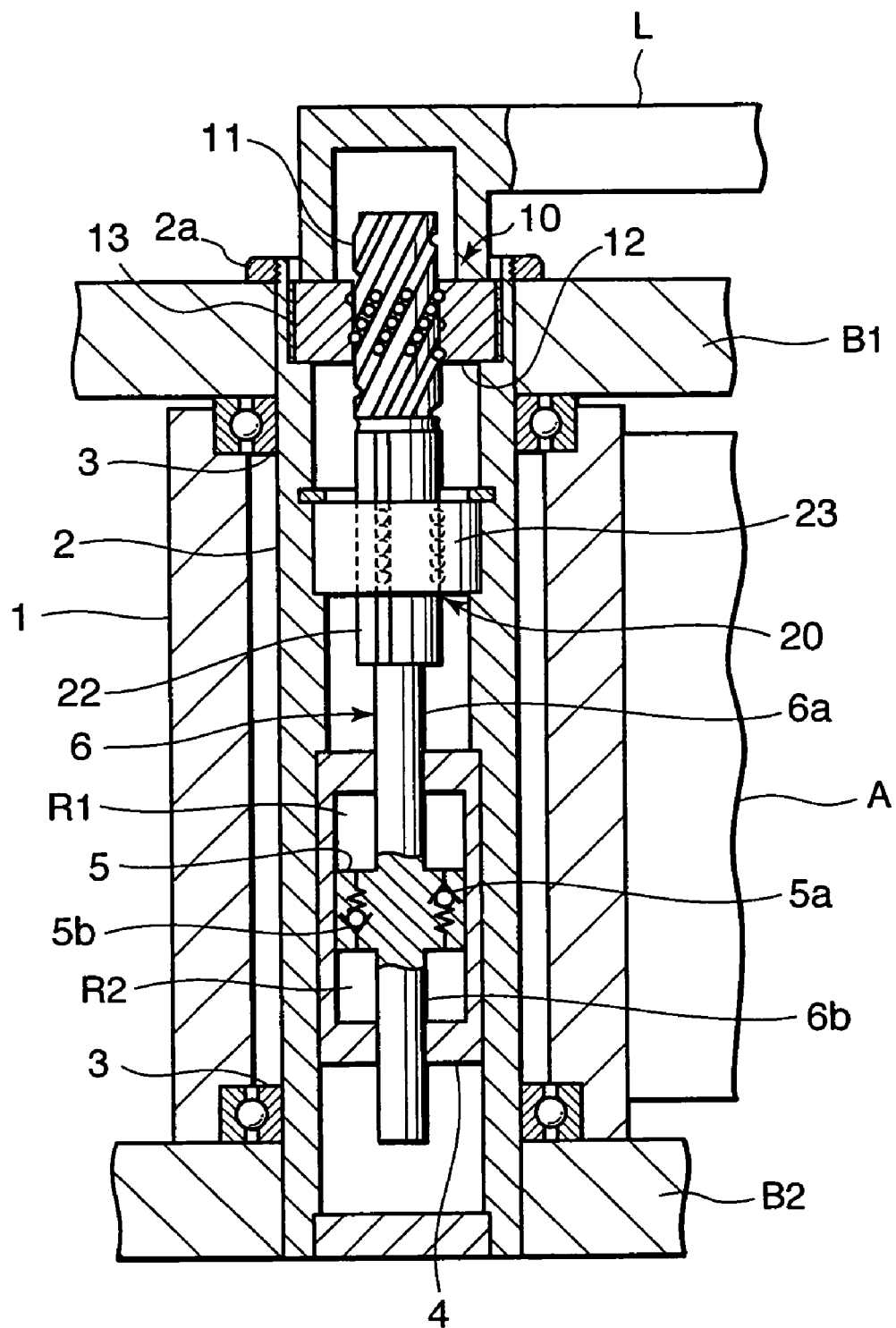
FIG. 4 is similar to FIG. 2 but shows a further embodiment of this invention.

Referring to FIG. 4, a further embodiment of this invention will be described. This embodiment differs from the first embodiment in the positional relationship between the ball screw 10 and the rotation prevention unit 20 and in the construction of the rotation prevention unit 20.

A ball spline used for the rotation prevention unit 20 comprises a spline shaft portion 22 formed on the upper piston rod 6a under the screw portion 11 and a spline hub 23 that the spline shaft portion 22 penetrates. The spline shaft portion 22 has a plurality of linear grooves in its outer circumferential surface and the spline hub 23 has the same number of linear grooves in its inner circumferential surface. The spline hub 23 is fixed to the inner circumference of the steering shaft 2. Bearing balls are interposed between each groove of the spline shaft portion 22 and each groove of the spline hub 23 so as to allow axial displacement of the spline shaft portion 22 with respect to the spline hub 23 while preventing a rotational displacement of the spline shaft portion 22 with respect to the spline hub 23.

The ball nut 12 is supported by the steering shaft via a bearing 13 so as to be free to rotate. An end of the link L, another end of which is fixed to the vehicle body A, is connected fixedly to the ball nut 12.

When the handlebars are turned with respect to the vehicle body A, the fork brackets B1 and B2 to which the handlebars are fixed perform a rotational displacement together with the steering shaft 2, the cylinder 4, the spline hub 23, the piston 5, and the piston rods 6a, 6b with respect to the head pipe 1 and the ball nut 12 fixed to the vehicle body A via the link L.

As a result, in the ball screw 10, the ball nut 12 functions as a feed screw to exert a thrust force on the upper piston rod 6a, causing the upper piston rod 6a to displace axially. As a result, the piston 5 displaces in an axial direction in the cylinder 4.

According to this axial displacement of the piston 5 in the cylinder 4, working oil flows between the chamber R1 and the chamber R2 through the damping valve 5a or 5b, and a damping force is generated in the damping valve 5a or 5b due to the flow resistance thereof. The damping force thus generated damps the rotational displacement of the handlebars, and abrupt turning of the handlebars is thereby mitigated.

Yawing motion of the front wheel caused by shimmy or kickback of the front wheel is also transferred to the fork brackets B1 and B2 via the pair of front forks F. The fork brackets B1 and B2 then rotate together with the steering shaft 2, the piston 5 and the piston rods 6a and 6b. In this case also, the steering damping device generates a damping force against the rotational displacement of the fork brackets B1 and B2 with respect the vehicle body A, as in the case of the handlebar operation. Unintended yaw or yaw oscillation of the front wheel is thereby suppressed.

According to this embodiment, the piston rod 6a, 6b and the piston 5 do not rotate with respect to the cylinder 4 but displace in an axial direction only. This construction prevents a sealing member disposed between the piston 5 and the cylinder 4 and a sealing member disposed between the piston rods 6a, 6b and the cylinder 4 from becoming twisted, and hence brings about a preferable effect in terms of the durability of the sealing members.

In this embodiment, it is possible to dispose the ball spline comprising the spline shaft portion 22 and the spline hub 23 under the cylinder 4. Specifically, the spline shaft portion 22 is formed on the lower piston rod 6b, and only the screw portion 11 is formed on the upper piston rod 6a.

According to this arrangement, by supporting an end of the lower piston rod 6b using the spline hub 23, oscillation of the end of the lower piston rod 6b with respect to the steering shaft 2 is prevented. The piston rods 6a, 6b are thereby kept permanently coaxial with the cylinder 4, which contributes to a stable operation of the steering damping device.

According to any of the embodiments described above, most parts of the steering damping device, including the linear damper, are not exposed to the outside of the steering shaft 2. Accordingly, a space outside the steering shaft 2 which is used for the steering damping device is minimized.

Further, since the displacement conversion mechanism converts the rotational displacement of the steering shaft 2 into the linear motion of the linear damper, no bending load is exerted on the piston rods 6a, 6b. A preferable effect in terms of a structure is also obtained according to this invention.

The contents of Tokugan 2007-172146, with a filing date of Jun. 29, 2007 in Japan and Tokugan 2008-098110, with a filing date of Apr. 4, 2008 are hereby incorporated by reference.

Although the invention has been described above with reference to certain embodiments, the invention is not limited to the embodiments described above. Modifications and variations of the embodiments described above will occur to those skilled in the art, within the scope of the claims.

For example, this invention is not affected by the shape or type of the front fork F. An inverted type front fork, which comprises an outer tube connected to the handlebars and an inner tube connected to the front wheel, or an upright type front fork, which comprises an inner tube connected to the handlebars and an outer tube connected to the front wheel can be combined with the steering damping device according to this invention.

The embodiments of this invention in which an exclusive property or privilege is claimed are defined as follows.

What is claimed is:

1. A steering damping device for a motorcycle in which a front wheel and handlebars are connected to a vehicle body so as to be displaceable in a direction of yaw, the motorcycle comprising a hollow steering shaft which performs a rotational displacement with respect to the vehicle body accompanying yaw of the front wheel and the handlebars, the steering damping device comprising:
   a linear damper disposed in the steering shaft, the linear damper comprising a component which is accommodated in the steering shaft, the component accommodated in the steering shaft being movable in a linear direction with respect to the steering shaft; and
   a displacement conversion mechanism which converts the rotational displacement of the steering shaft into a linear motion of the component.

2. The steering damping device as defined in claim 1, wherein the motorcycle comprises a pair of front forks supporting the front wheel and a vertical pair of fork brackets connecting the front forks and the handlebars, and the steering shaft is fixed to the vertical pair of fork brackets.

3. The steering damping device as defined in claim 1, wherein the motorcycle comprises a head tube fixed to the vehicle body, and the steering shaft penetrates the head tube and is supported by the head tube by a bearing so as to be free to rotate.

4. A steering damping device for a motorcycle in which a front wheel and handlebars are connected to a vehicle body so as to be displaceable in a direction of yaw, the motorcycle comprising a hollow steering shaft which performs a rotational displacement with respect to the vehicle body accompanying yaw of the front wheel and the handlebars, the steering damping device comprising:
   a linear damper disposed in the steering shaft, the linear damper comprising a component which performs a linear motion; and
   a displacement conversion mechanism which converts the rotational displacement of the steering shaft into the linear motion of the component, wherein the linear damper comprises a cylinder fixed to an inner circumferential surface of the steering shaft, and the component comprises a piston accommodated in the cylinder and a pair of piston rods that are fixed to the piston and project axially from the cylinder.

5. The steering damping device as defined in claim 4, wherein the displacement conversion mechanism comprises a ball screw comprising a spiral groove formed in an outer circumferential surface of one of the piston rods and a feed screw that is engaged with the spiral groove and drives the piston rods axially while rotating relative to the spiral groove.

6. The steering damping device as defined in claim 5, wherein the displacement conversion mechanism further comprises a link which connects the feed screw to the vehicle body such that the feed screw does not rotate with respect to the vehicle body, and a rotation prevention unit which prevents one of the piston rods from performing a rotational displacement while allowing an axial displacement with respect to the steering shaft.

7. The steering damping device as defined in claim 6, wherein the rotation prevention unit comprises a spline hub fixed to the inner circumferential surface of the steering shaft and a spline shaft portion formed in the outer circumferential surface of one of the piston rods and splined to the spline hub.

8. The steering damping device as defined in claim 5, wherein the displacement conversion mechanism further comprises a rotation prevention unit which prevents the piston rods from performing a rotational displacement while allowing an axial displacement with respect to the vehicle body, and the feed screw is fixed to the inner circumferential surface of the steering shaft.

9. The steering damping device as defined in claim 5, wherein the rotation prevention unit comprises a guide tube splined to the outer circumference of one of the piston rods, and a link which connects the guide tube to the vehicle body such that the guide tube does not rotate with respect to the vehicle body.

10. The steering damping device as defined in claim 4, wherein the linear damper further comprises a damping valve which generates a damping force against an oil flow between two oil chambers delimited by the piston in the cylinder.

* * * * *